(12) United States Patent
Mosca

(10) Patent No.: US 7,222,750 B2
(45) Date of Patent: May 29, 2007

(54) TRANSFER AND DOSING DEVICE OF PULVERULENT OR GRANULAR MATERIAL CONTAINED IN A HOPPER

(75) Inventor: Pierre Mosca, Aix les Bains (FR)

(73) Assignee: Movidis, Meythet (FR)

( * ) Notice: Subject to any disclaimer, the term of this patent is extended or adjusted under 35 U.S.C. 154(b) by 0 days.

(21) Appl. No.: 11/196,326

(22) Filed: Aug. 4, 2005

(65) Prior Publication Data

US 2006/0032729 A1 Feb. 16, 2006

(30) Foreign Application Priority Data

Aug. 10, 2004 (FR) .................................. 04 08798

(51) Int. Cl.
*B67D 5/08* (2006.01)
(52) U.S. Cl. ...................... 222/55; 222/77; 222/181.1; 222/185.1; 198/758; 198/761; 198/750.14; 198/550.02
(58) Field of Classification Search ................ 198/758, 198/759, 761, 750.14, 550.01, 550.02; 222/55, 222/77, 160, 181.1, 185.1
See application file for complete search history.

(56) References Cited

U.S. PATENT DOCUMENTS

| | | | |
|---|---|---|---|
| 522,779 A | | 7/1894 | Carstens et al. |
| 3,578,094 A | * | 5/1971 | Henry et al. ............... 177/108 |
| 3,797,633 A | * | 3/1974 | Stambera .................... 177/120 |
| 4,382,527 A | * | 5/1983 | Lerner ......................... 222/56 |
| 4,722,456 A | * | 2/1988 | Laidlaw et al. ............... 222/58 |
| 4,762,252 A | * | 8/1988 | Hyer et al. .................... 222/56 |
| 4,944,428 A | * | 7/1990 | Gmur et al. .................. 222/55 |
| 5,094,342 A | * | 3/1992 | Kraus et al. ................. 198/761 |
| 5,132,897 A | * | 7/1992 | Allenberg .................... 700/29 |
| 5,341,307 A | * | 8/1994 | Myhre et al. ............... 700/240 |
| 5,665,941 A | * | 9/1997 | Wehhofer et al. ......... 177/25.13 |
| 5,938,074 A | * | 8/1999 | Dartus ........................... 222/1 |
| 6,032,828 A | * | 3/2000 | Gicza et al. .................... 222/1 |
| 6,168,305 B1 | * | 1/2001 | Marmsater .................. 700/240 |
| 6,237,409 B1 | * | 5/2001 | Labschies .................... 73/218 |
| 6,402,363 B1 | * | 6/2002 | Maguire ..................... 366/141 |
| 6,545,230 B2 | * | 4/2003 | Tamai et al. .............. 177/25.18 |
| 6,631,799 B2 | * | 10/2003 | Samson ....................... 198/771 |
| 7,053,317 B2 | * | 5/2006 | Asai et al. ................ 177/25.18 |
| 2004/0060802 A1 | | 4/2004 | Kwasniewica et al. |

FOREIGN PATENT DOCUMENTS

| | | |
|---|---|---|
| DE | 44 07 071 A1 | 9/1995 |
| EP | 0 933 313 A2 | 8/1999 |
| FR | 1 113 864 A | 4/1956 |

* cited by examiner

*Primary Examiner*—Joe Dillon, Jr.
(74) *Attorney, Agent, or Firm*—Oliff & Berridge, PLC

(57) ABSTRACT

A dosing device of a pulverulent material uses an oscillating drive mechanism with straight to-and-fro movement to extract and dose a pulverulent material contained in a hopper with a calibrated outlet aperture, and then to transfer the extracted mass to a removal point. The hopper can be fixed or movable. To measure the mass flowrate extracted from the aperture, the hopper is connected to the mechanism by a flexible blade and bears on a table equipped with a weighing cell formed by a weight sensor. The weight variation indicates the mass flowrate, which can be adjusted by acting on the oscillation frequency of the mechanism, or on the opening of the outlet aperture.

11 Claims, 10 Drawing Sheets

TRANSFER AND DOSING DEVICE OF PULVERULENT OR GRANULAR MATERIAL CONTAINED IN A HOPPER

BACKGROUND OF THE INVENTION

The invention relates to a transfer and dosing device of a pulverulent or granular material by means of a transporting means mechanically linked to drive means.

STATE OF THE ART

Pulverulent material extraction and dosing operations can be performed either by an endless screw device or by vibrating systems of the crank-rod type. The mechanical vibrations of vibrating systems apply a sinusoidal movement to the pulverulent products, the tangent at the origin of which movement comprises a vertical component and a horizontal component in the direction of transfer. The structure of these known devices is complicated and does not enable weighing and mass flowrate measurements of the extracted material to be performed easily.

The document U.S. Pat. No. 522,779 relates to a mineral feeding machine comprising a hopper fixed with respect to the receiving vessel, which is animated by a straight symmetric alternate movement generated by a crank-rod mechanism.

OBJECT OF THE INVENTION

The object of the invention consists in providing a transfer and dosing device of a pulverulent material, enabling weight variation measurement, and mass flowrate regulation in continuous or discontinuous operation.

The device according to the invention is characterized in that it comprises:
- an oscillating mechanism animated with a straight and dissymmetric to-and-fro movement and having a faster return speed than the speed in the forward direction, the forward direction corresponding to the direction of transfer of the pulverulent material,
- a hopper fed by said material and comprising in addition an outlet aperture of calibrated cross-section designed to extract said material in the forward direction and to dose the extracted mass,
- a flexible blade connected to the mechanism and bearing on a table equipped with a weighing cell designed for continuous measurement of the mass flowrate extracted from the aperture of the hopper.

According to one feature of the invention, the horizontal stroke of the to-and-fro movement of the mechanism is adjustable between 0.5 mm and 20 mm, the oscillation frequency being comprised between 5 Hz and 100 Hz. It is thus possible to dose a given quantity of pulverulent material with precision by adjusting different parameters, in particular the oscillation frequency, the cross-section of the hopper outlet aperture, and also the incline of the system with respect to a horizontal plane. The outlet aperture of the hopper is equipped for this purpose with an adjustable blanking means to control the flow of the extracted mass.

According to a preferred embodiment of the invention, the hopper is connected to the mechanism by a flexible blade, and bears on a table equipped with a weighing cell designed for continuous measurement of the mass flowrate extracted from the aperture of the hopper. The flexible blade is formed by a steel strip fixed by screws to the mechanism and to the hopper. The weighing cell comprises a weight sensor fixed onto an intercalation placed on the fixed support, and above which there is located a fixed table whereon the base of the hopper slides with a sliding part interposed there-between. The blade presents a rigidity in the direction of the movement, and is flexible in the gravitational direction, so as to enable measurement of the total weight of the hopper and of its pulverulent material content.

According to another feature of the invention, the hopper is fed by a vertical storage tube of the pulverulent material, said tube emptying progressively by gravity in the hopper compensating the mass flowrate extracted via the aperture. The distance between the bottom of the hopper and the bottom base of the tube is adjustable by means of adjustment screws to adapt the emptying rate of the tube to the flow characteristics of the pulverulent material.

According to an alternative embodiment, the mechanism is located underneath a longitudinal transfer chute connected to the outlet aperture, the hopper and chute being driven by the oscillating mechanism.

According to another alternative embodiment, the hopper is fixed and the movable blade extends along the bottom of the hopper.

BRIEF DESCRIPTION OF THE DRAWINGS

Other advantages and features will become more clearly apparent from the following description of an embodiment of the invention given as a non-restrictive example only and represented in the accompanying drawings, in which.

DESCRIPTION OF A PREFERRED EMBODIMENT

Figure 1:
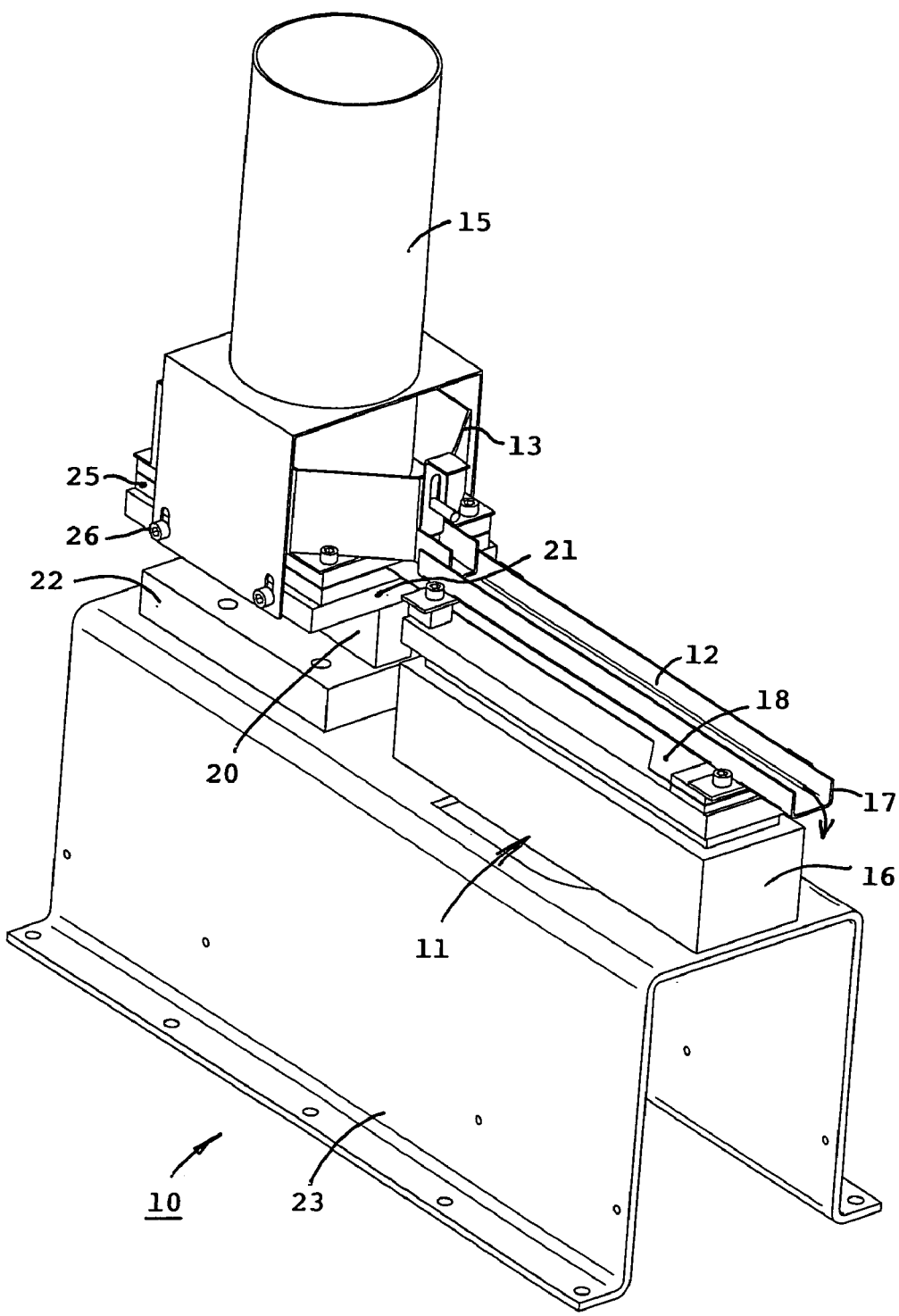
FIG. 1 is a schematic perspective view of the transfer and dosing device of a pulverulent material according to the invention.
Figure 2:
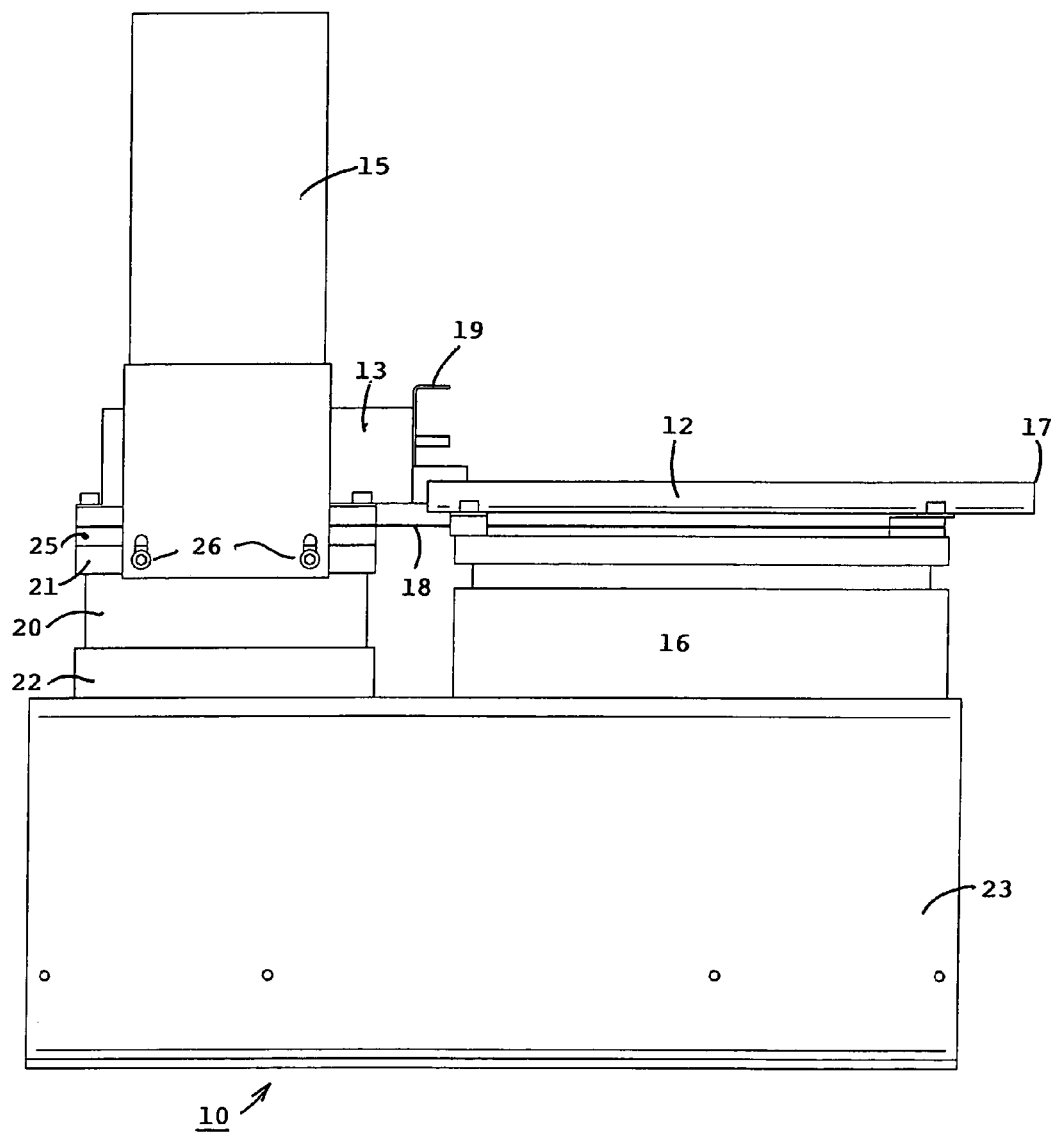
FIG. 2 shows an elevation of the device of FIG. 2.
Figure 3:
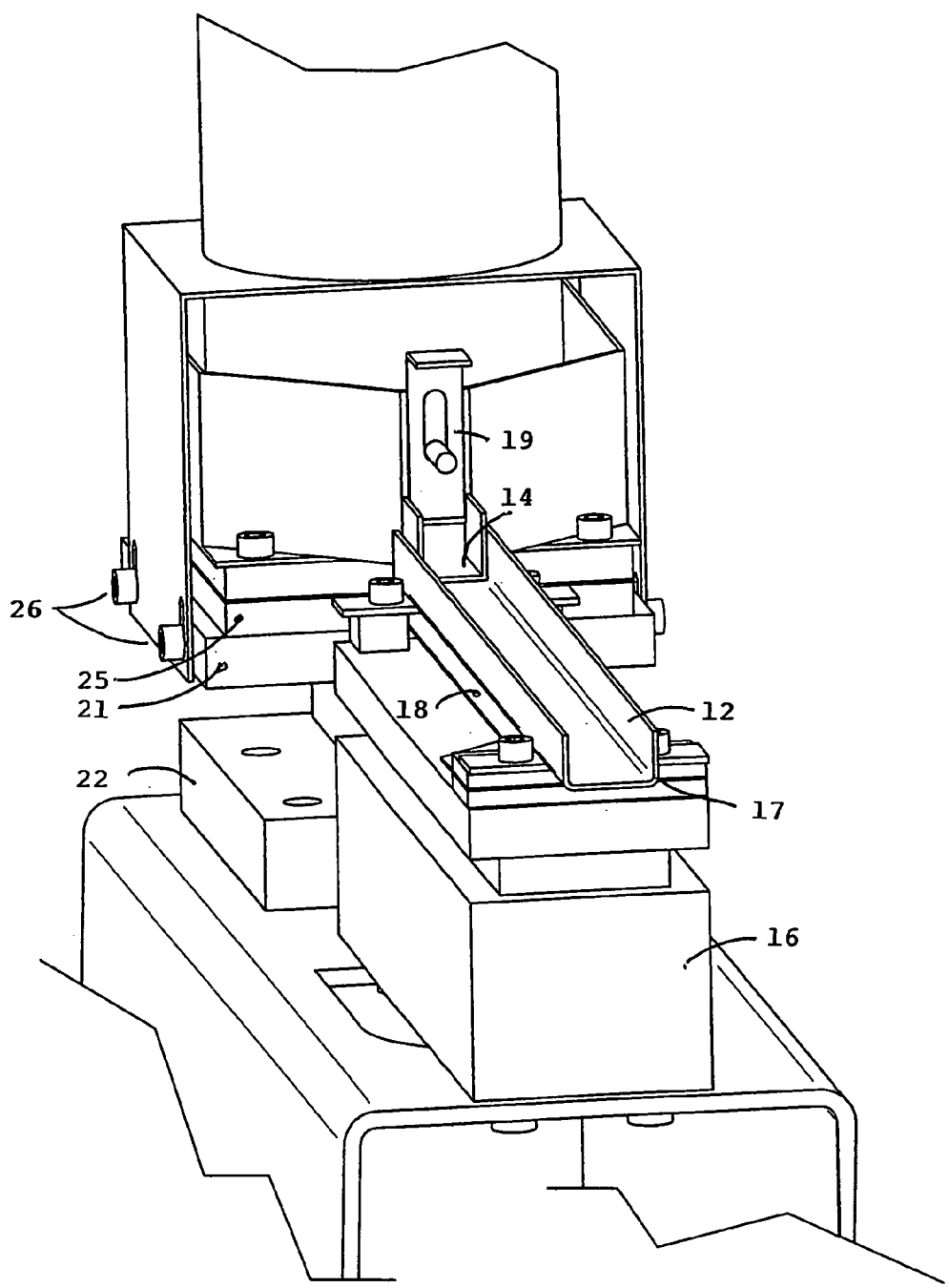
FIG. 3 represents a detailed view of the chute positioned on the vibrating mechanism and facing the outlet aperture of the hopper.
Figure 4:
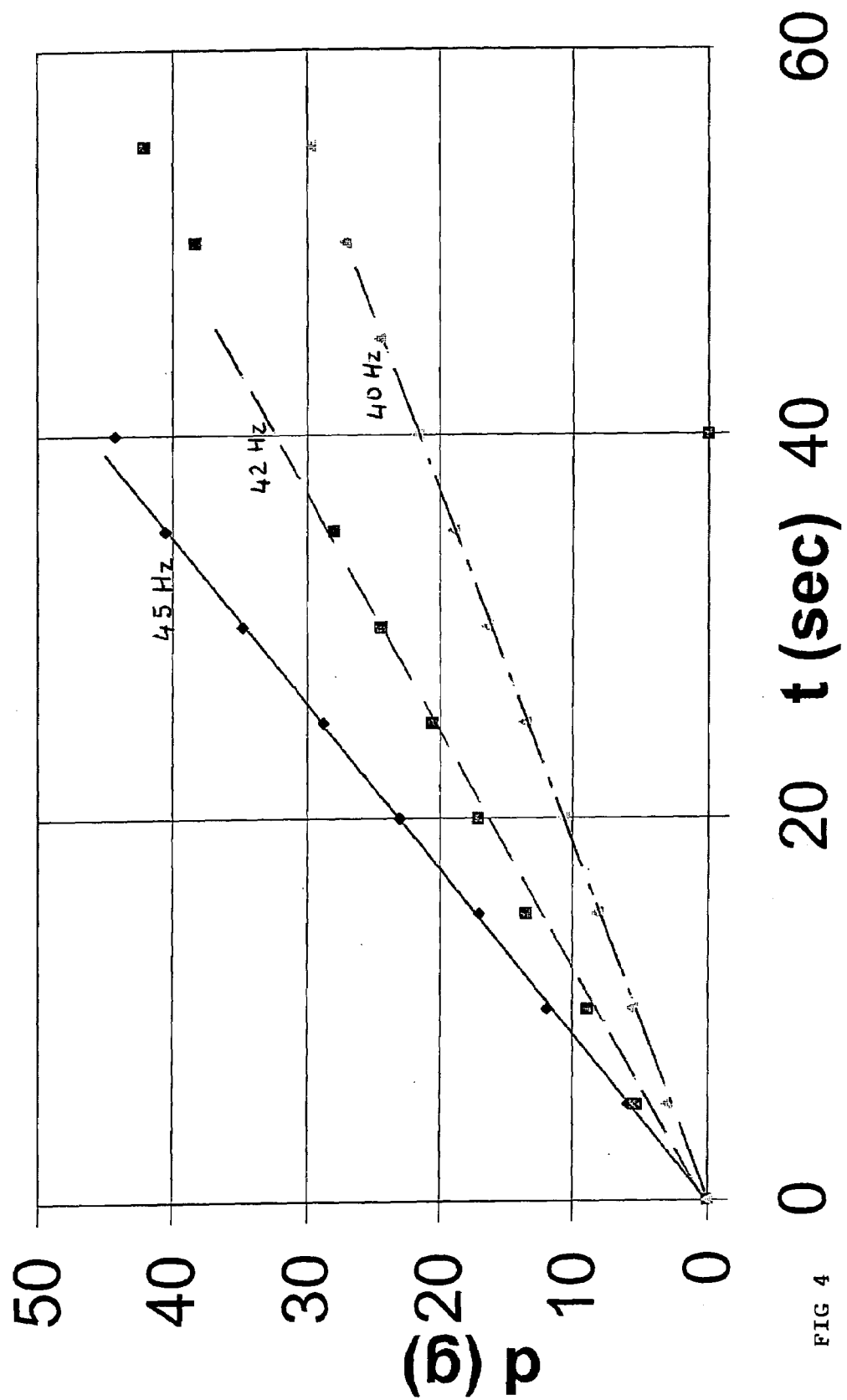
FIG. 4 illustrates diagrams of the mass flowrate extracted versus the oscillation frequency of the mechanism.
Figure 5:
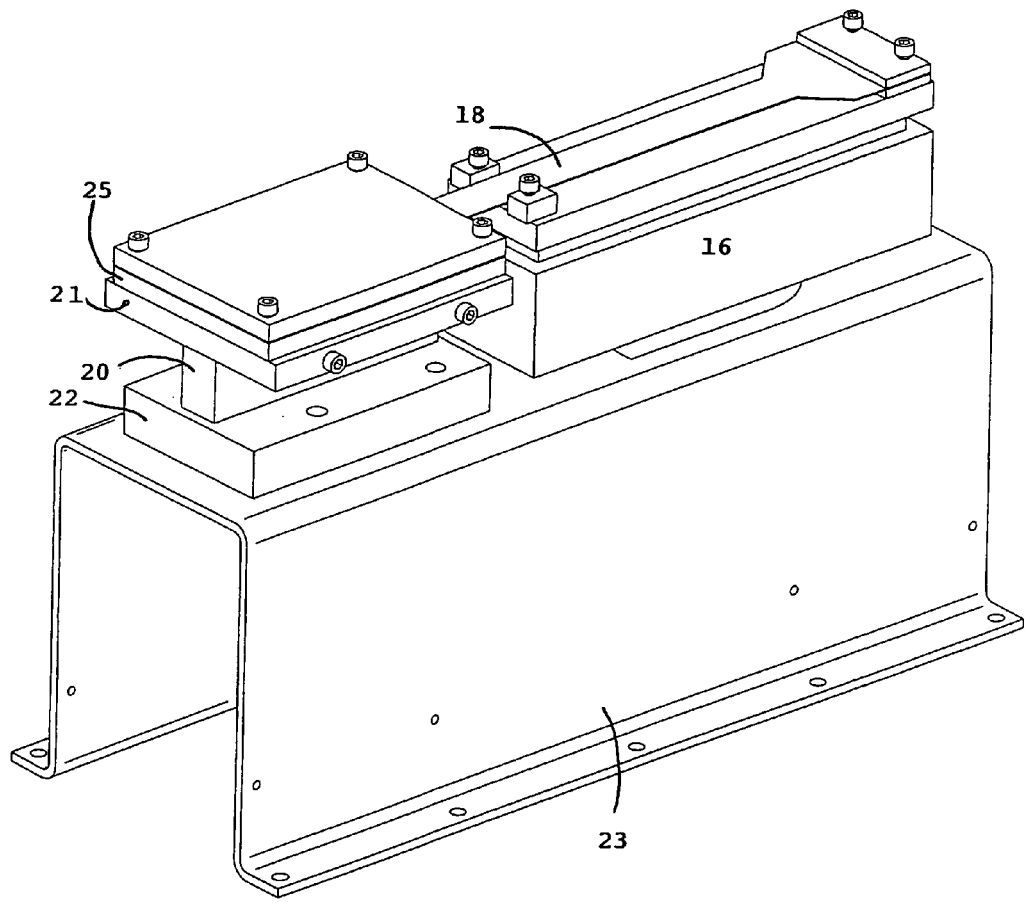
FIG. 5 is a partial view of FIG. 1, showing the flexible blade after the chute and the hopper and storage tube assembly have been removed.
Figure 6:
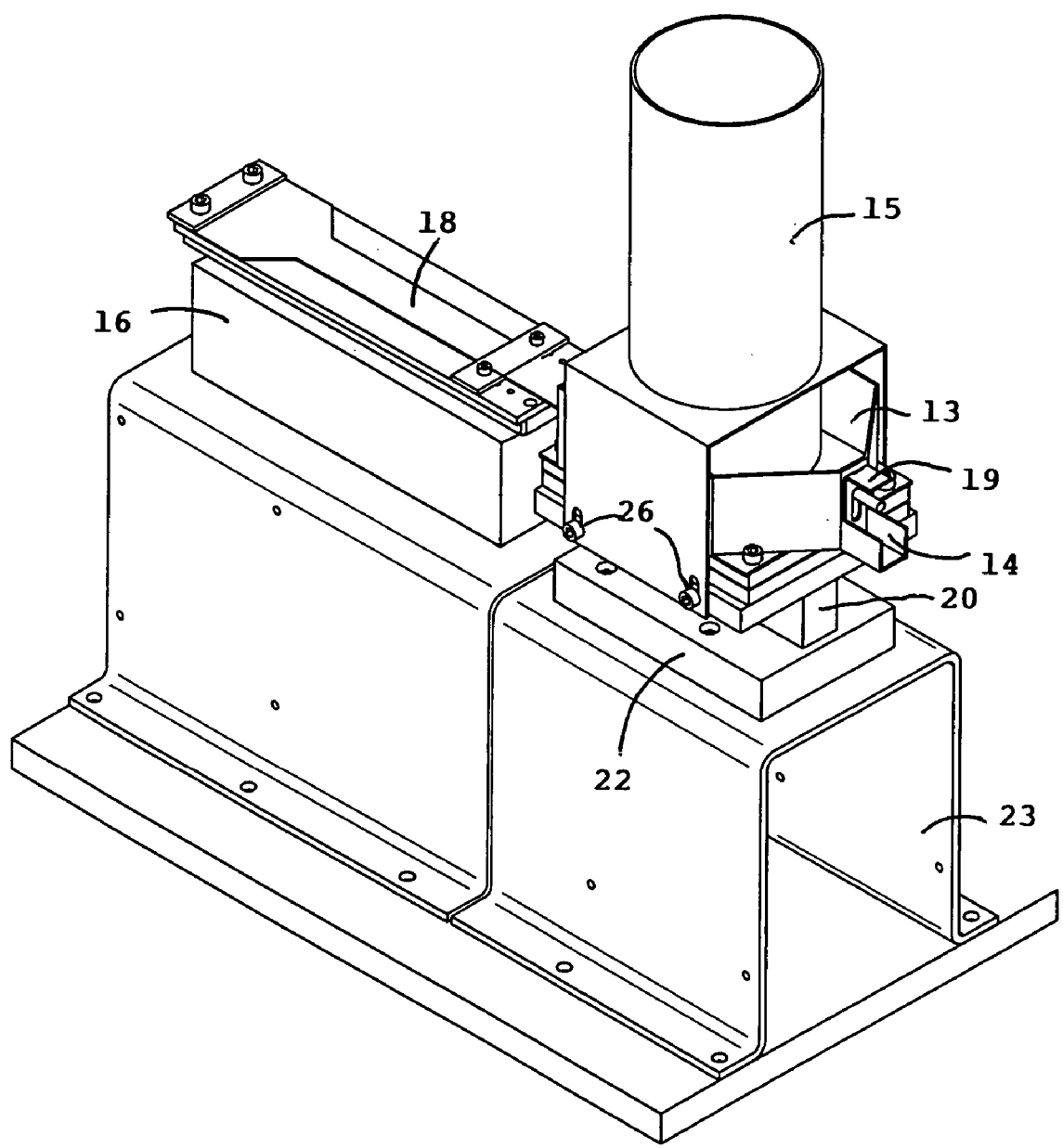
FIGS. 6 and 8 show schematic perspective views of an alternative embodiment.
Figure 7:
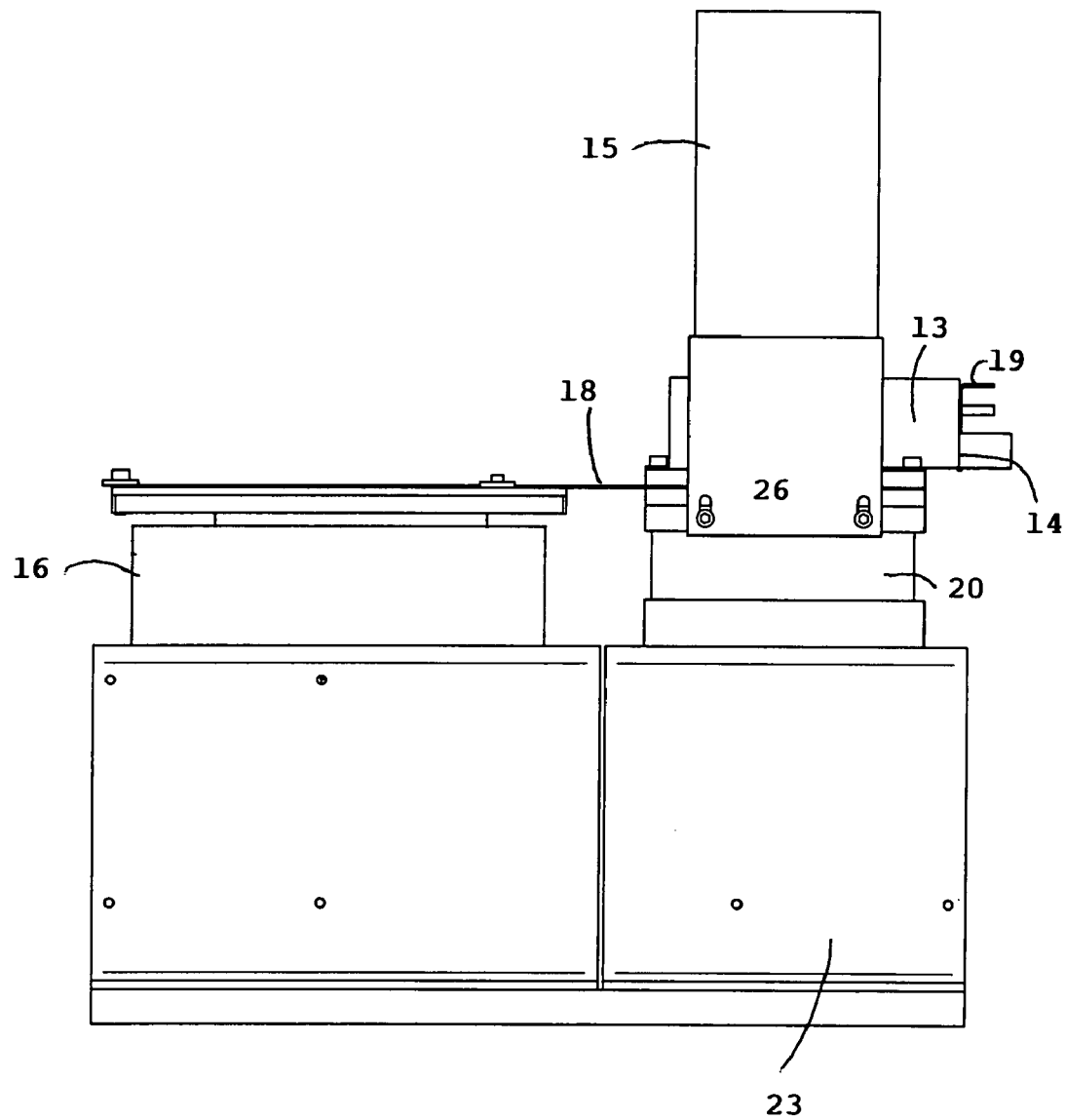
FIG. 7 is an elevation of the device of FIG. 6.
Figure 8:
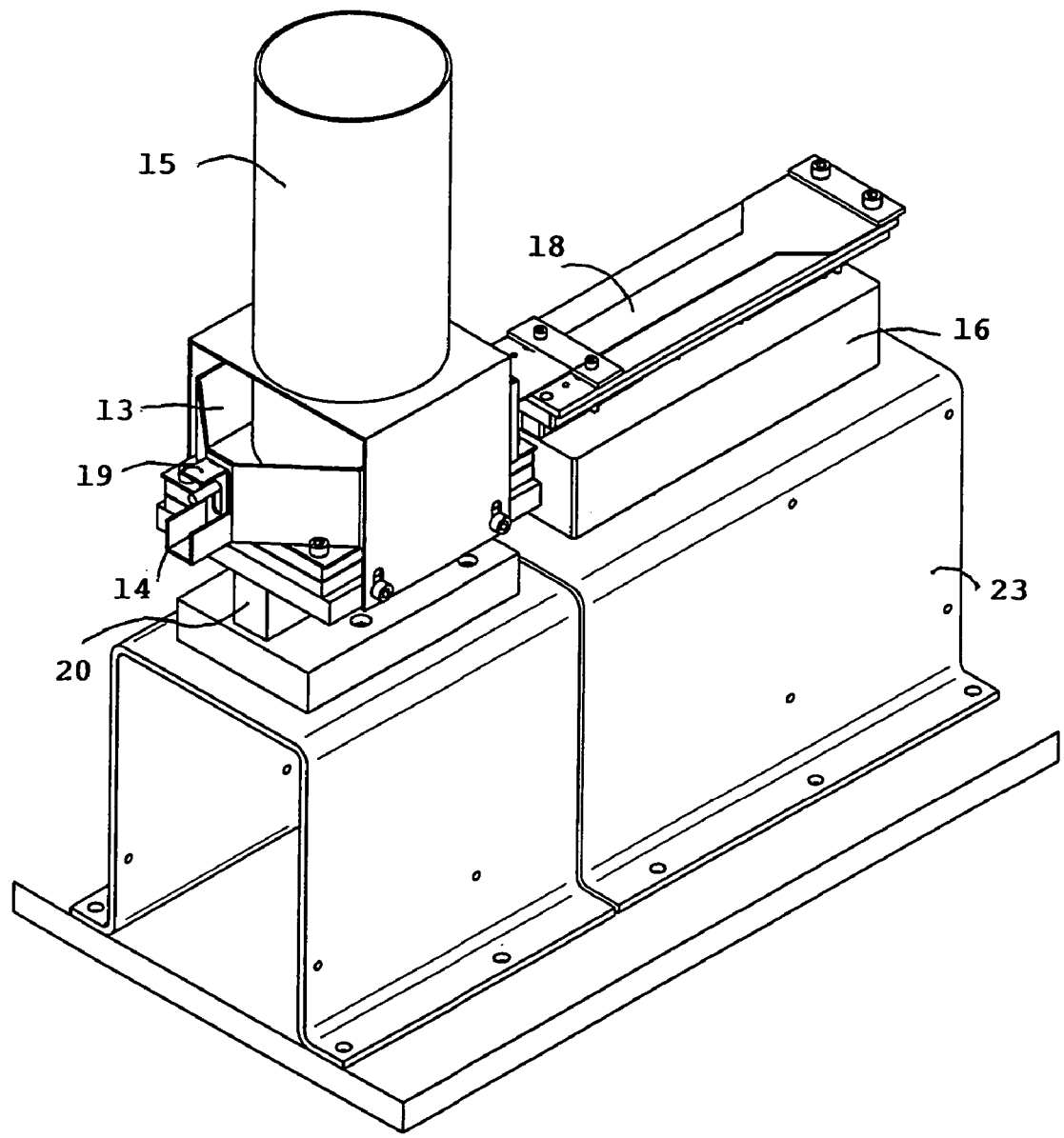
Figure 9:
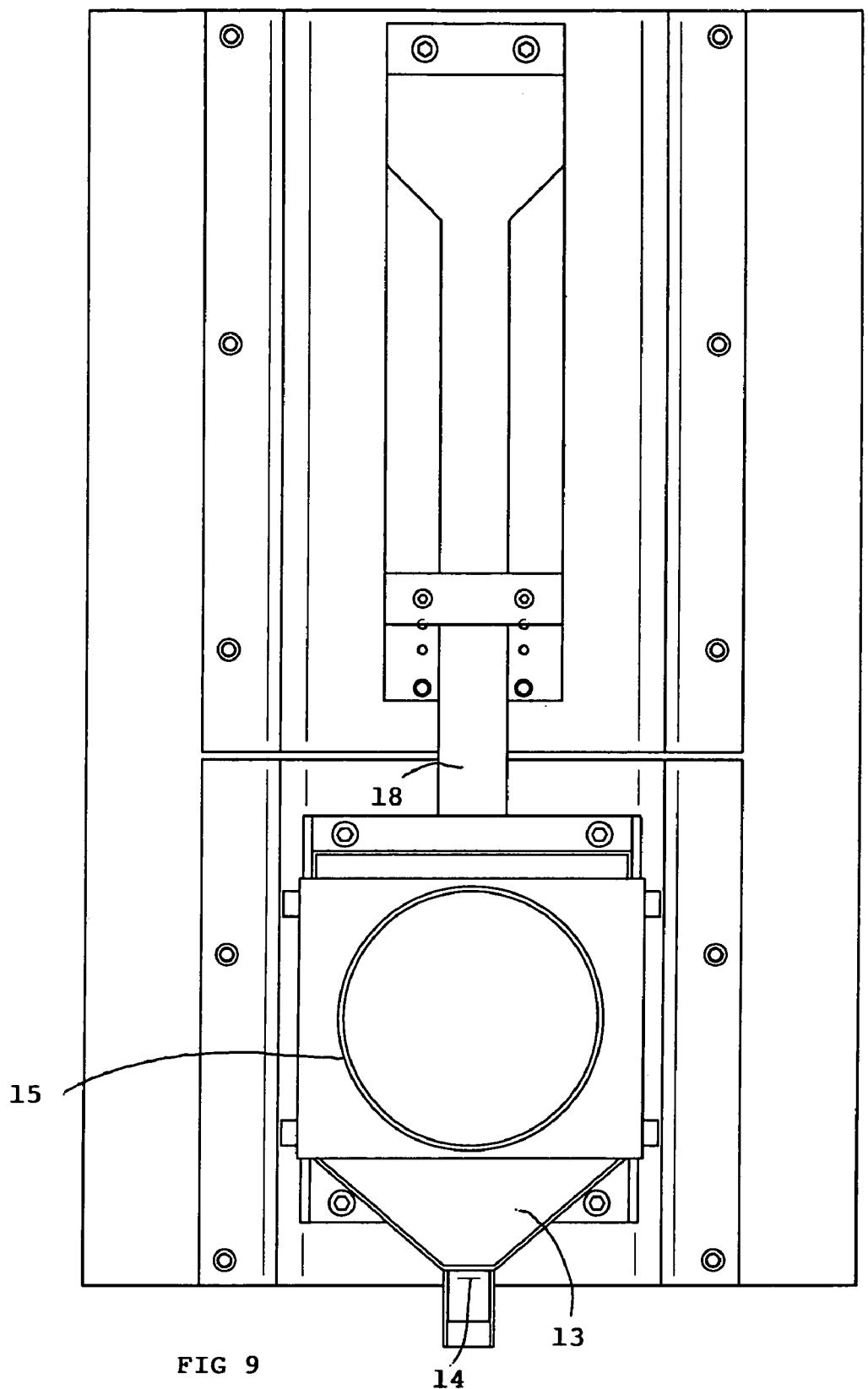
FIG. 9 represents a plan view of FIG. 8.

With reference to FIGS. 1 to 5, a dosing device 10 for dosing pulverulent or granular material comprises drive means 11 designed to produce an alternative transfer movement, a guide and transfer chute 12 constituting the transporting means of the pulverulent or granular material, a storage hopper 13 provided with an outlet aperture 14, and a vertical tube 15 for accumulation of said pulverulent material placed above the hopper 13.

The drive means 11 comprise an oscillating mechanism 16 animated with a straight and dissymmetric to-and-fro movement with a horizontal stroke adjustable from 0.5 mm to 20 mm. The oscillation frequency is preferably comprised between 5 and 100 Hz, and the speed of movement in the return direction is faster than that of the forward direction, the latter corresponding to the direction of transfer or of extraction of the pulverulent material. The ratio of the speeds respectively in the forward and return directions is comprised between ⅕ and ⅟₅₀. The pulverulent material is subjected to reversed accelerations, which has the effect of setting it in motion in the forward direction, fluidizing and breaking up the agglomerates.

The oscillating mechanism 16 can be formed by a geared motor coupled to a rotary drive cam having a specific profile, or by any other air-controlled or electromagnet-controlled oscillating actuator.

The chute 12 is securely affixed to the mechanism 16 and is animated with the same oscillating to-and-fro movement. One of the ends of the chute 12 is positioned facing the outlet aperture 14 of the hopper 13, and the extracted flow is transferred to a removal point 17 opposite the aperture 14. The chute 12 illustrated in the figures is straight and presents a U-shaped profile, but any other shape is possible, in particular a V-shaped, rectangular, circular or semi-circular cross-section.

The hopper 13 and chute 12 can be made indifferently of metal, glass, plastic or any other material suitable for machining, molding or shaping operations.

The flow extracted via the outlet aperture 14 of the hopper 13 can be controlled by an adjustment valve 19 so as to obtain a calibrated outlet cross-section. The valve 19 is formed for example by a slide or guillotine valve, but any other adjustable blanking means can be used.

In addition to adjustment of the aperture 14, the mass flowrate extracted via the outlet aperture 14 depends on different parameters, in particular on the oscillation frequency of the mechanism 16 by modifying the speed of the drive motor (see FIG. 4), and also on the amplitude and transient accelerations of the oscillating movement, and on the incline of the chute 12 and of the hopper 13. These parameters can be adjusted during operation, either manually or automatically in case of flow regulation.

To perform continuous measurement of the mass flowrate extracted, driving of the hopper 13 is performed by a flexible blade 18 formed by a tempered or stainless steel strip and fixed both to the mechanism 16 and to the hopper 13. A weight sensor 20 is fixed onto an intercalation 22 placed on the fixed support 23 and above which there is located a fixed table 21 whereon the base of the hopper 13 slides with a sliding part 25 interposed there-between.

The blade 18 presents a high rigidity in the direction of movement, but is very flexible in the gravitational direction, which enables the total weight of the hopper 13, of the vertical storage tube 15, and of their respective contents of pulverulent material to be measured in operation. The negative weight variation indicated by the weight sensor 20 represents the mass flowrate extracted from the outlet aperture 14 of the hopper 13.

To perform weighing of the mass extracted from the hopper 13, the chute 12 and hopper 13 are both driven synchronously, without being mechanically linked to one another.

The vertical storage tube 15 of the pulverulent material is securely affixed to the fixed table 21 so as to prevent weighing errors due to friction of the pulverulent products on the walls of the tube 15. The tube 15 empties progressively by gravity into the hopper 13 compensating the mass flowrate extracted via the aperture 14. The blade 18 drives only the hopper 13 with an oscillating movement, but not the tube 15 which remains fixed and is weighed with its content by the weight sensor 20.

The hopper 13 and tube 15 can be fed manually or automatically. In the latter case, a level detector (not shown) can be integrated in the hopper 13 or in the tube 15 to perform automatic filling control. The chute 12 and/or hopper 13 can be inclined in the direction of transfer to speed up the extracted material flow rate.

The distance between the bottom of the hopper 13 and the bottom base of the tube 15 is adjustable by means of adjustment screws 26 to adapt the emptying rate of the tube 15 to the flow characteristics of the pulverulent material.

According to an alternative embodiment (not shown), the storage tube 15 is eliminated and the hopper 13 is filled directly by the pulverulent material to a predetermined level.

With reference to FIGS. 6 to 9, the same reference numbers will be used to designate analogous parts to those of the previous figures. The chute 12 is eliminated and the position of the oscillating mechanism 16 has been inverted, being situated opposite the outlet aperture 14 of the hopper 13. The flexible blade 18 is fixed both to the mechanism 16 and directly to the hopper 13. The rest of the device is identical to that of FIGS. 1 to 5.

Figure 10:
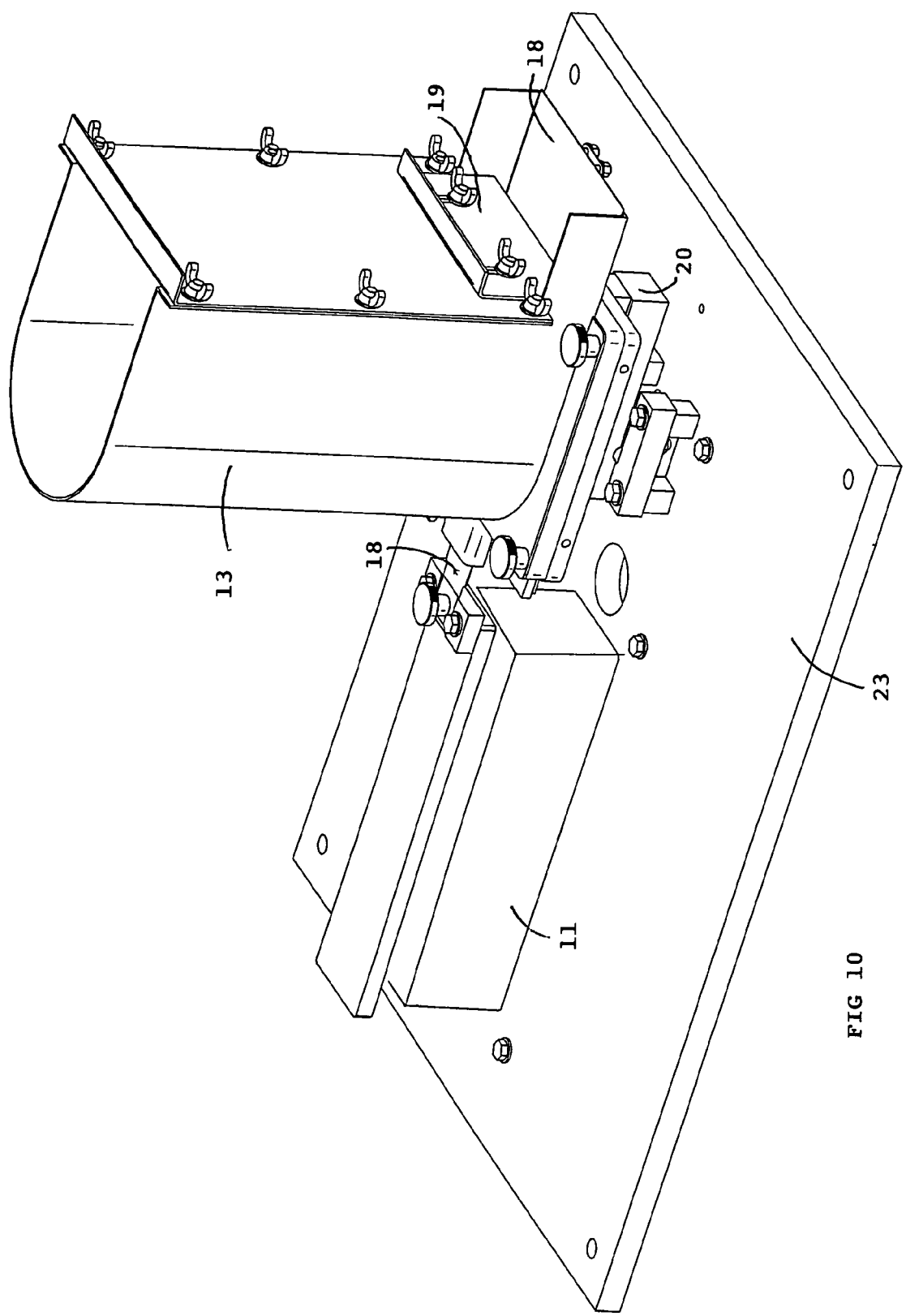
FIG. 10 shows a schematic perspective view of another alternative embodiment.

According to the alternative embodiment of FIG. 10, the hopper 13 is fixed and the oscillating blade 18 extends along the bottom of the hopper 13.

The invention claimed is:

1. Transfer and dosing device of a pulverulent or granular material, comprising:
    an oscillating mechanism animated with a straight and dissymmetric to-and-fro movement having a faster return speed than a speed in a forward direction, the forward direction corresponding to the direction of transfer of the pulverulent material,
    a transfer surface linked to the oscillating mechanism,
    a hopper having an outlet aperture of calibrated cross-section,
    a table equipped with a weighing cell designed for continuous measurement of a mass flowrate extracted from the outlet aperture of the hopper, the outlet aperture being configured to extract the pulverulent or granular material in the forward direction and to dose the extracted mass,
    a flexible blade connected to the oscillating mechanism and bearing on the table equipped with a weighing cell, wherein movement of the flexible blade causes the pulverulent or granular material to be transferred from the hopper.

2. The transfer and dosing device according to claim 1, wherein the horizontal stroke of the to-and-fro movement of the oscillating mechanism is adjustable between 0.5 mm and 20 mm, and wherein the oscillating mechanism has an oscillation frequency between 5 Hz and 100 Hz.

3. The transfer and dosing device according to claim 1, wherein the outlet aperture of the hopper is equipped with an adjustable blanking means to control the flowrate of the extracted mass.

4. The transfer and dosing device according to claim 3, wherein the blanking means comprises a slide or guillotine valve.

5. The transfer and dosing device according to claim 1, wherein the oscillating mechanism is situated underneath the transfer surface, the transfer surface comprising a longitudinal transfer chute connected to the outlet aperture, the hopper and chute being driven by the oscillating mechanism.

6. The transfer and dosing device according to claim 1, wherein the hopper is fixed and the blade extends along the bottom of the hopper.

7. The transfer and dosing device according to claim 1, wherein the flexible blade is formed by a steel strip fixed by screws to the oscillating mechanism and to the hopper.

8. The transfer and dosing device according to claim 1, wherein the weighing cell comprises a weight sensor fixed onto an intercalation placed on a fixed support, the table being fixedly located above the weight sensor whereon the base of the hopper slides with a sliding part interposed there-between.

9. The transfer and dosing device according to claim 7, wherein the blade presents a rigidity in the direction of the movement, and is flexible in the gravitational direction, so as to enable measurement of the total weight of the hopper and of its pulverulent or granular material content.

10. The transfer and dosing device according to claim 1, wherein the hopper is fed by a vertical storage tube of the pulverulent or granular material, the tube emptying progressively by gravity into the hopper compensating the mass flowrate extracted via the aperture.

11. The transfer and dosing device according to claim 10, wherein a distance between a bottom of the hopper and a bottom base of the tube is adjustable by means of at least one adjustment screw to adapt an emptying rate of the tube to a flow characteristics of the pulverulent or granular material.

* * * * *